United States Patent
Serebrin et al.

(10) Patent No.: US 8,464,028 B2
(45) Date of Patent: Jun. 11, 2013

(54) REDIRECTION TABLE AND PREDICTOR FOR FETCHING INSTRUCTION ROUTINES IN A VIRTUAL MACHINE GUEST

(75) Inventors: Benjamin C. Serebrin, Sunnyvale, CA (US); Anton Chernoff, Harvard, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1152 days.

(21) Appl. No.: 12/357,563

(22) Filed: Jan. 22, 2009

(65) Prior Publication Data

US 2009/0187904 A1 Jul. 23, 2009

Related U.S. Application Data

(60) Provisional application No. 61/022,700, filed on Jan. 22, 2008.

(51) Int. Cl.
  *G06F 9/30* (2006.01)
  *G06F 9/455* (2006.01)

(52) U.S. Cl.
  USPC ........... 712/205; 712/220; 712/227; 712/239; 718/1; 703/26

(58) Field of Classification Search
  None
  See application file for complete search history.

(56) References Cited

U.S. PATENT DOCUMENTS

| | | | | |
|---|---|---|---|---|
| 5,574,873 A | * | 11/1996 | Davidian | 712/200 |
| 5,751,982 A | * | 5/1998 | Morley | 712/209 |
| 5,790,825 A | * | 8/1998 | Traut | 712/209 |
| 6,044,220 A | * | 3/2000 | Breternitz, Jr. | 717/139 |
| 6,223,254 B1 | * | 4/2001 | Soni | 711/125 |
| 6,298,481 B1 | | 10/2001 | Kosaka et al. | |
| 7,516,453 B1 | * | 4/2009 | Bugnion | 718/1 |
| 2003/0115578 A1 | * | 6/2003 | Liokumovich et al. | 717/138 |
| 2003/0217250 A1 | | 11/2003 | Bennett et al. | |
| 2004/0117532 A1 | | 6/2004 | Bennett et al. | |
| 2006/0224815 A1 | * | 10/2006 | Yamada et al. | 711/6 |

OTHER PUBLICATIONS

Ertl et al., "Optimizing Indirect Branch Prediction Accuracy in Virtual Machine Interpreters", Jun. 2003, 11 pages.*

* cited by examiner

*Primary Examiner* — David Huisman
(74) *Attorney, Agent, or Firm* — Lawrence J. Merkel; Meyertons, Hood, Kivlin, Kowert & Goetzel, P.C.

(57) ABSTRACT

In one embodiment, a processor comprises a redirect unit configured to detect a match of an instruction pointer (IP) in an IP redirect table, the IP corresponding to a guest instruction that the processor has intercepted, wherein the guest is executed under control of a virtual machine monitor (VMM), and wherein the redirect unit is configured to redirect instruction fetching by the processor to a routine identified in the IP redirect table instead of exiting to the VMM in response to the intercept of the guest instruction.

12 Claims, 6 Drawing Sheets

US 8,464,028 B2

REDIRECTION TABLE AND PREDICTOR FOR FETCHING INSTRUCTION ROUTINES IN A VIRTUAL MACHINE GUEST

This application claims benefit of priority to U.S. Provisional Patent Application Ser. No. 61/022,700, filed Jan. 22, 2008. The Provisional Patent Application is incorporated herein by reference. To the extent that anything in the Provisional Patent Application contradicts material expressly included herein, the material herein controls.

BACKGROUND

1. Field of the Invention

This invention relates to virtual machines in computer systems and, more particularly, to processing intercepted instructions.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Both the VMM and the guests are executed by the processor(s) included in the physical machine. Accordingly, switching between execution of the VMM and the execution of guests occurs in the processor(s) over time. Particularly, the VMM schedules a guest for execution, and a switch to executing that guest is performed. At various points in time, a switch from executing a guest to executing the VMM also occurs so that the VMM can retain control over the physical machine (e.g. when the guest attempts to access a peripheral device, when a new page of memory is to be allocated to the guest, when it is time for the VMM to schedule another guest, etc.). A switch between a guest and the VMM (in either direction) is often referred to as a "world switch".

Intercepting certain instructions in the guest causes a world switch to the VMM. Instructions are intercepted for a variety of reasons. For example, an instruction that reads privileged processor state can be intercepted to ensure that the VMM will permit the guest to access the state (or to permit the VMM to perform the access on behalf of the guest). In some cases, the VMM changes processor state from the value that the guest established or expects, and instructions which access the state are intercepted to permit the VMM to supply the expected state instead of the changed state. An instruction that writes privileged state or other processor/system state that the VMM desires to control can be intercepted. In response to each interception, the VMM is invoked to emulate the intercepted event and provide an appropriate response.

SUMMARY

In one embodiment, a method comprises, in a processor, detecting an intercept of an instruction that is in a guest that is controlled by a virtual machine monitor (VMM), wherein the instruction has an associated instruction pointer (IP) used to locate the instruction in memory. The method further comprises detecting a match by the associated instruction pointer with an IP in an entry in an IP redirect table responsive to detecting the intercept. The method still further comprises redirecting instruction fetch in the processor to a routine identified in the IP redirect table responsive to the match instead of exiting the guest to the VMM.

In an embodiment, a processor comprises a redirect unit configured to detect a match of an IP with an IP in an entry in an IP redirect table. A match occurs when an IP is determined to correspond to an entry in the IP redirect table. In various embodiments, a match may be determined by comparison of all or a portion of the IP with all or a portion of an IP in an entry in the IP redirect table, or by comparison of the IP with part of the entry's index or offset into the table, etc. The IP corresponds to a guest instruction that the processor has intercepted. The guest is executed under control of a virtual machine monitor (VMM), and the redirect unit is configured to redirect instruction fetching by the processor to a routine identified in the IP redirect table instead of exiting to the VMM in response to the intercept of the guest instruction.

In an embodiment, a computer accessible storage medium stores a plurality of instructions which, when executed in response to an exit from a guest in response to an intercept of an instruction in the guest: detect that a routine is available to be executed in response to the intercept of the instruction; and update an IP redirect table that is accessed by a processor that executes the guest. The update includes an IP corresponding to the instruction and an address of the routine in memory, whereby a subsequent intercept of the instruction will redirect to the routine instead of exiting the guest. The processor accesses the IP redirect table subsequent to detecting the intercept and prior to exiting the guest.

BRIEF DESCRIPTION OF THE DRAWINGS

The following detailed description makes reference to the accompanying drawings, which are now briefly described.

Figure 1:
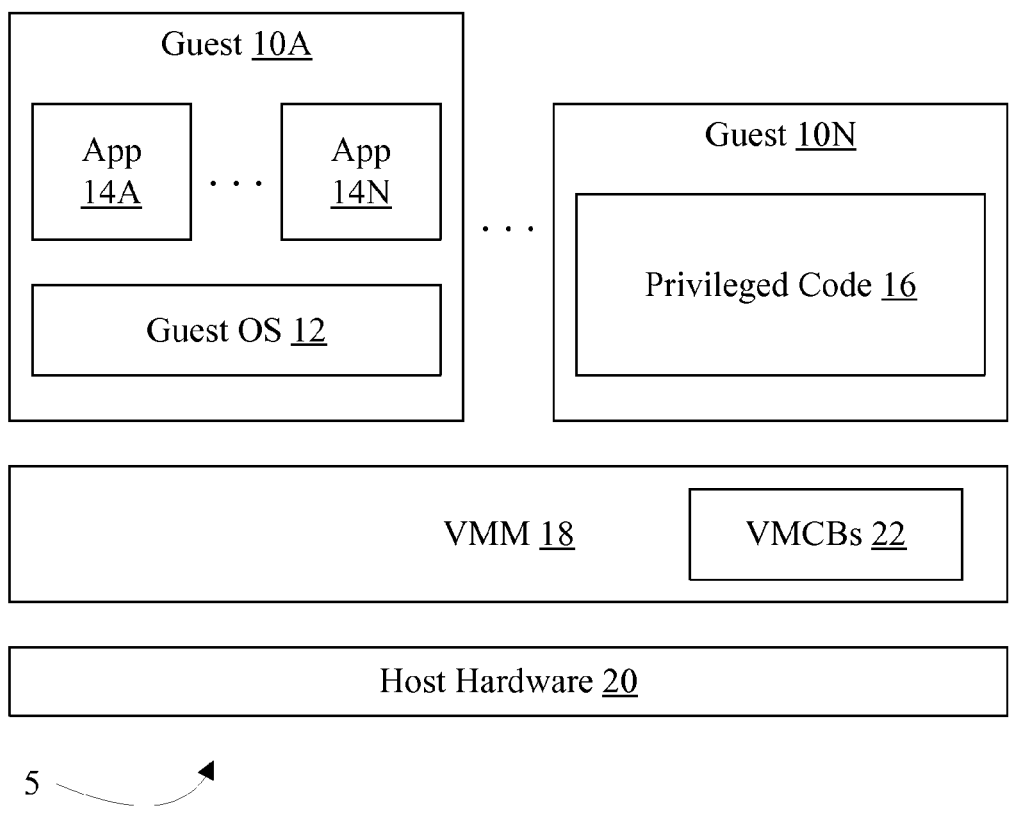
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Virtualization Overview

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the "host", in one embodiment.

In various embodiments, the VMM 18 may support full virtualization, paravirtualization, or both, as defined in the following paragraph. Furthermore, in some embodiments, the VMM 18 may concurrently execute guests that are paravirtualized and guests that are fully virtualized.

With full virtualization, the guest 10A-10N may not be aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20. In one embodiment, in full virtualization, guests 10A-10N do not directly interact with the peripheral devices in the host hardware 20.

With paravirtualization, guests 10A-10N may be at least partially aware that virtualization is occurring. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. In such an implementation, only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (which is referred to in this example as the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected. Furthermore, in one embodiment, two or more variants of VMRUN may be defined, and the amount of state loaded and the location of state that is loaded may vary depending on which variant is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event or at least executes VM-controlled code (e.g. various routines described in further detail below) in response to the intercepted event, even if the guest is not exited to the VMM 18. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event. In another embodiment, the first set of intercept indications may indicate which intercept events are to be intercepted and the second set of intercept indications may indicate which exit mechanism to use for each intercept.

Generally, the exit mechanism may define the operations performed by the processor to exit guest execution (generally in a restartable fashion) and to begin executing other code. In one embodiment, one exit mechanism may include saving a small amount of processor state and loading state for a minivisor, which may be code inserted by the VMM 18 into a guest or which may execute "near" the guest, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

In one embodiment, the processor(s) in the host hardware 20 may support an alternate address space when the VMM code (e.g. the VMM 18 and/or the minivisor, in embodiments that implement the minivisor) is being executed. The alternate address space may be the virtual address space of the guest which has most recently exited. Accordingly, if the VMM code needs to access memory that is accessed by the guest, the VMM code need not include instructions to locate the guest's page tables, process the page tables ("walk" the page tables) to identify the translation, walk the nested page tables (where implemented) and read the resulting physical address in memory. Instead, the VMM code may include an instruction that specifies the alternate address space for the access and the translation hardware may automatically translate the address through the page tables indicated by the alternate address space (e.g. the guest's page tables). Performance of the VMM code may be improved.

IP Redirect Table

Intercepts are implemented to ensure that the VMM remains in control of the virtual machine guest. Processing some intercepts may be complicated and/or may differ from occurrence to occurrence of the intercept. For example, the intercepted instruction, its operands, etc. may need to be analyzed at each intercept to determine the appropriate operations to be performed by the VMM to process the intercept and return to the guest. Such intercepts may be handled by exiting the guest to the VMM. Exiting the guest to the VMM may include saving at least a portion of the processor state corresponding to the guest into the corresponding VMCB, loading corresponding state for the VMM into the processor, and invoking the VMM. In embodiments that implement the minivisor, exiting to the minivisor may be included in "exiting to the VMM" to simplify the discussion of the IP redirect table herein.

However, other intercepts may be simpler and/or more regular in their processing. In one embodiment, the VMM may provide a set of predefined routines, each of which may process a particular intercept type. That is, simply identifying the intercept may be enough to invoke the routine to process the intercept. Such predefined routines may also be referred to here in as "handlers."

Frequently-occurring intercepted instructions (i.e. the same instruction at the same point in the guest code) that require the same emulation each time may be converted into a dynamically-generated routine that can be executed in response to the intercept. The effort of analyzing the intercept to determine the emulation that needs to be performed may be avoided once the routine has been generated, and the routine may simply be executed to implement the intercept processing. Such a dynamically-generated routine may be referred to herein as a "binary translation" or simply a "translation", since a routine is effectively substituted for the intercepted instruction.

For either the dynamically-generated translation or the predefined handlers (or both) or any other embodiment of an intercept, it may be possible to store the routines in memory that is accessible by the processor without performing a guest exit (also referred to as a VMExit, herein). Instead, based on the instruction pointer (IP) used to locate the intercepted instruction in memory, the processor may be redirected to the beginning of the corresponding routine. The redirect may be similar to a branch misprediction or other similar event in the processor: instructions that are subsequent to the intercepted instruction may be discarded by the processor and the processor may begin fetching instructions from the routine.

The processor supports an IP redirect table to perform the redirection. The IP redirect table may be programmable (e.g. by the VMM) with IPs corresponding to instructions whose intercepts can be handled using a routine and IPs of those routines. The processor, in response to detecting an intercept for an instruction, may determine if the IP of the instruction matches an IP stored in the IP redirect table. If the IP matches, the processor may redirect instruction fetch to the IP of the routine without exiting the guest to the VMM. If the IP does not match, the processor may exit the guest to the VMM. Accordingly, a guest exit may be avoided in favor of a redirect for some routines.

As used herein, a "routine" comprises a code sequence including a plurality of instructions that are intended to be executed from beginning to end. It is possible to have exceptions during the execution of the routine, in some embodiments, but in the absence of an exception the routine may generally execute to completion. The routine may include branches, looping behavior, etc., similar to other code sequences. As used herein, an instruction pointer may generally be an address that is used to locate the corresponding instruction in memory. That is, the IP is used to fetch the instruction. The IP may be a virtual address, and may be translated through an address translation mechanism to a physical address. More particularly, in a virtualized environment described herein, the IP may be a guest virtual address, which may be translated to a guest physical address assigned by the privileged code in the guest. The guest physical address may further be translated to a host physical address assigned by the VMM, which may be used to access memory. Alternatively, the IP used by the IP redirect table may be a guest physical address, a host virtual address, or a host physical address.

The memory storing the routines may be protected from guest modification or observability in various fashions. For example, the routines may be stored and accessed using host physical addresses, and the processor may enter a mode when redirected that permits the host physical access to occur. The processor may exit the mode when the routine returns to the guest. A similar scheme may use host virtual addresses. Alternatively, the routines may be accessed using guest physical addresses or guest virtual addresses, and no processor mode may be needed.

Figure 2:
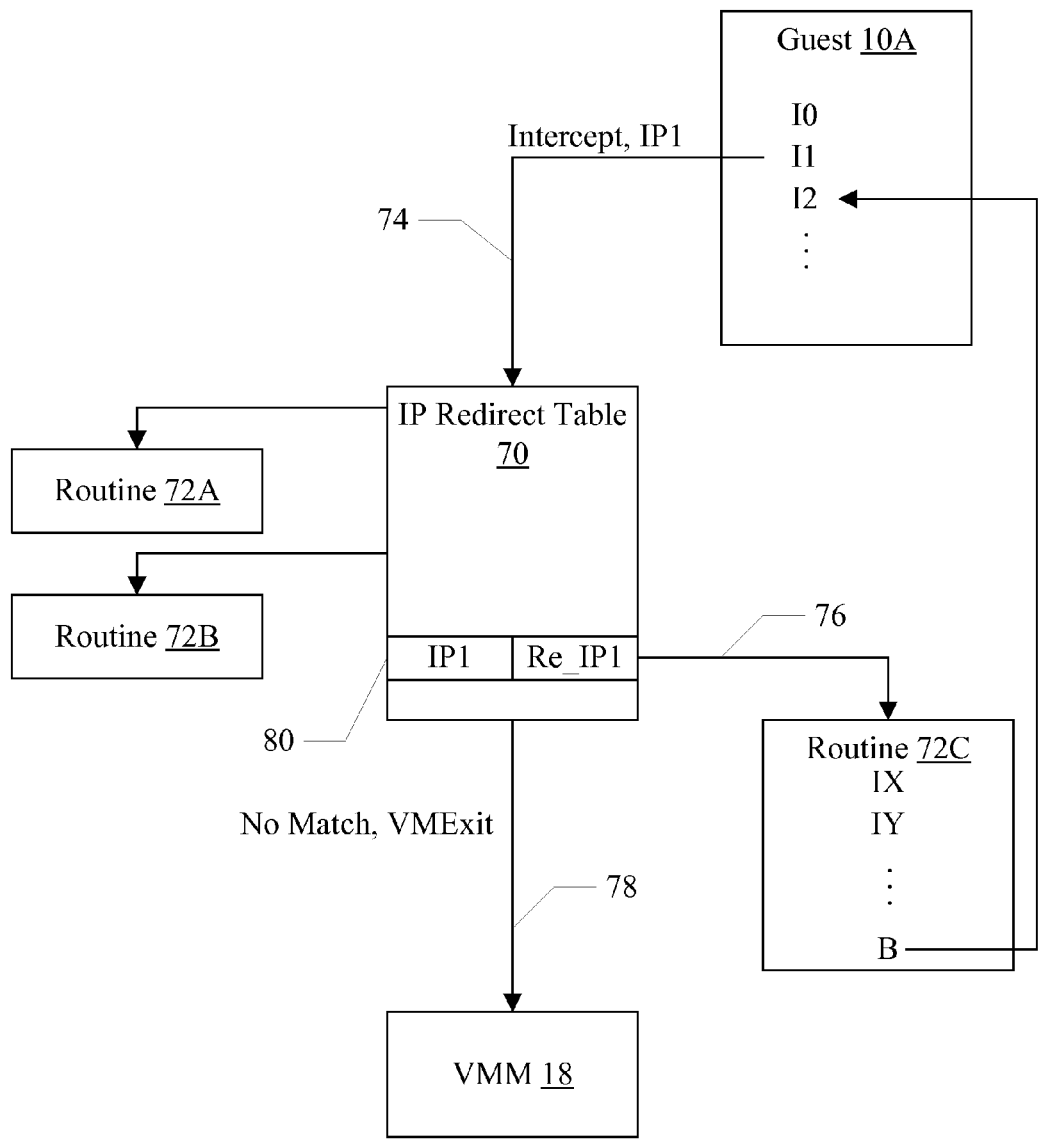
FIG. 2 is a block diagram illustrating one embodiment of a guest, a VMM, an IP redirect table, and a set of routines.

Turning now to FIG. 2, a block diagram illustrating one embodiment of a guest 10A, an IP redirect table 70, the VMM 18, and a set of routines 72A-72C is shown. The routines 72A-72C may be predefined handlers, dynamically-generated translations, or a combination thereof. FIG. 2 illustrates a logical flow of an intercept event, for one embodiment.

The guest 10A is illustrated as having various instructions in a sequence (I0, I1, and I2). In this example, I1 is to be intercepted. Accordingly, the processor may detect that the instruction is to be intercepted. The intercept detection may occur at any point in the processor's pipeline prior to completing execution of the instruction. For example, the intercept detection may occur in an execution unit when the processor begins the process of executing the instruction; in a scheduler (distributed reservation stations or centralized scheduler) when the instruction is selected for dispatch to an execution unit; in a microcode unit that provides a microcode routine that implements the instruction, for embodiments implementing microcode; etc.

Responsive to detecting the intercept, the processor may determine if the IP corresponding to the instruction matches an IP in the IP redirect table 70 (e.g. IP1, arrow 74). If the IP matches, the processor may use the address of the routine from the matching entry of the IP redirect table 70 (e.g. Re IP1 in FIG. 2, arrow 76 to routine 72C). The processor may redirect fetching to the routine 72C, including instructions such as IX and IY in FIG. 2, and terminating with a branch (B) or other control flow instruction (e.g. the x86 return instruction RET) to return to the guest 10A. The routine 72C returns to the instruction following the intercepted instruction (e.g. I2 following intercepted I1) in this example. Other entries of the IP redirect table 70 may point to the other routines 72A-72B. In some cases, more than one entry may point to the same routine 72A-72C (e.g. if the routine is a handler that may be used by multiple intercepted instructions or if the routine is a dynamically-generated translation that is general enough to be used by more than one intercepted instruction).

If the IP does not match any IP in the IP redirect table 70 (arrow 78), the processor may exit the guest to the VMM 18 (VMExit) for further processing of the intercept.

The IP redirect table 70 comprises a plurality of entries, one of which is illustrated in FIG. 2 (reference numeral 80). In the example of FIG. 2, the entry 80 includes at least a portion of the IP corresponding to the intercepted instruction (IP1) and the redirect IP pointing to the routine 72C. Other entries may be similar, and may store other IPs and corresponding redirect IPs. The IP redirect table 70 may be organized in any desired fashion. For example, the table 70 may be direct-mapped, in which a portion of the input IP is used as an index to select one entry in the table 70. The remainder of the input IP may be compared to the IP in the selected entry to determine if the input IP is a match. Other embodiments may be organized to select multiple entries for a given index (e.g. similar to a set associative cache), and the remainder of the input IP may be compared to each selected entry to detect a match. In still other embodiments, any entry may store any IP (e.g. similar to a fully associative cache) and input IP may be compared to each entry to detect a match. Generally, the comparison may result in a match if the portion of the input IP matches the corresponding portion of the IP in an entry and the entry is valid.

In one embodiment, the IP redirect table 70 may be stored in memory and the processor may be programmed with a base address of the table 70. From the base address of the table and the input IP, the processor may select one or more table entries to read. Alternatively, the IP redirect table 70 may be implemented partially or fully in hardware, and the IP redirect table 70 may be accessed similar to a cache. Other embodiments may implement the IP redirect table 70 in other ways.

As mentioned previously, the input IP and the IPs stored in the table 70 and compared to the input IP may be any IP associated with the intercepted instruction. For example, the input IP may be a guest virtual address, a guest physical address, a host virtual address, or a host physical address. The redirect IP may be any IP at the same level as the input IP or a level closer to memory. For example, if the input IP is a guest virtual address, the redirect IP may be a guest virtual address, a guest physical address, a host virtual address, or a host physical address. If the input IP is a guest physical address, the redirect IP may be a guest physical address, a host virtual address, or a host physical address. If the input IP is a host physical address, the redirect IP may be a host physical address also. The routines 72A-72C may generally be accessible in the address space (guest virtual, guest physical, host virtual, or host physical) that corresponds to the redirect IP.

In some embodiments, the IP redirect table 70 may include more information in each entry, in addition to the IP and redirect IP. The information may indicate the validity of the entry, and may also include data that may be used to verify that the instruction at the IP is still the same instruction for which the matching entry was created. For example, if the IP is a guest virtual IP and nested paging is used, the guest may change the guest virtual to guest physical translation without the change being detected by the VMM 18. In such a case, a different instruction may have been intercepted and the redirect IP may be wrong.

The additional data may include one or more instruction bytes of the instruction (to be compared against the instruction bytes of the intercepted instruction). For example, opcode and operand specification bytes may be used. Rather than storing the instruction bytes, an encoded value that identifies the relevant data for a given intercepted instruction may be stored. Alternatively, the target routine may include instructions that verify the instruction bytes. In yet another alternative, the IP redirect table 70 may be stored in the guest virtual address space, so that a change to a different set of page tables by the guest implicitly makes the table unavailable. In still another alternative, the type of intercept (e.g. which intercept has been detected) may be stored and compared to the current intercept type. In another alternative, the index to the IP redirect table 70 may be some combination of IP bits, physical IP bits, instruction bytes, and processor mode bits to use different entries if the processor state and/or addresses are different on a subsequent intercept. Any combination of additional data to verify the IP match to a table entry may be used, in various embodiments.

Figure 3:
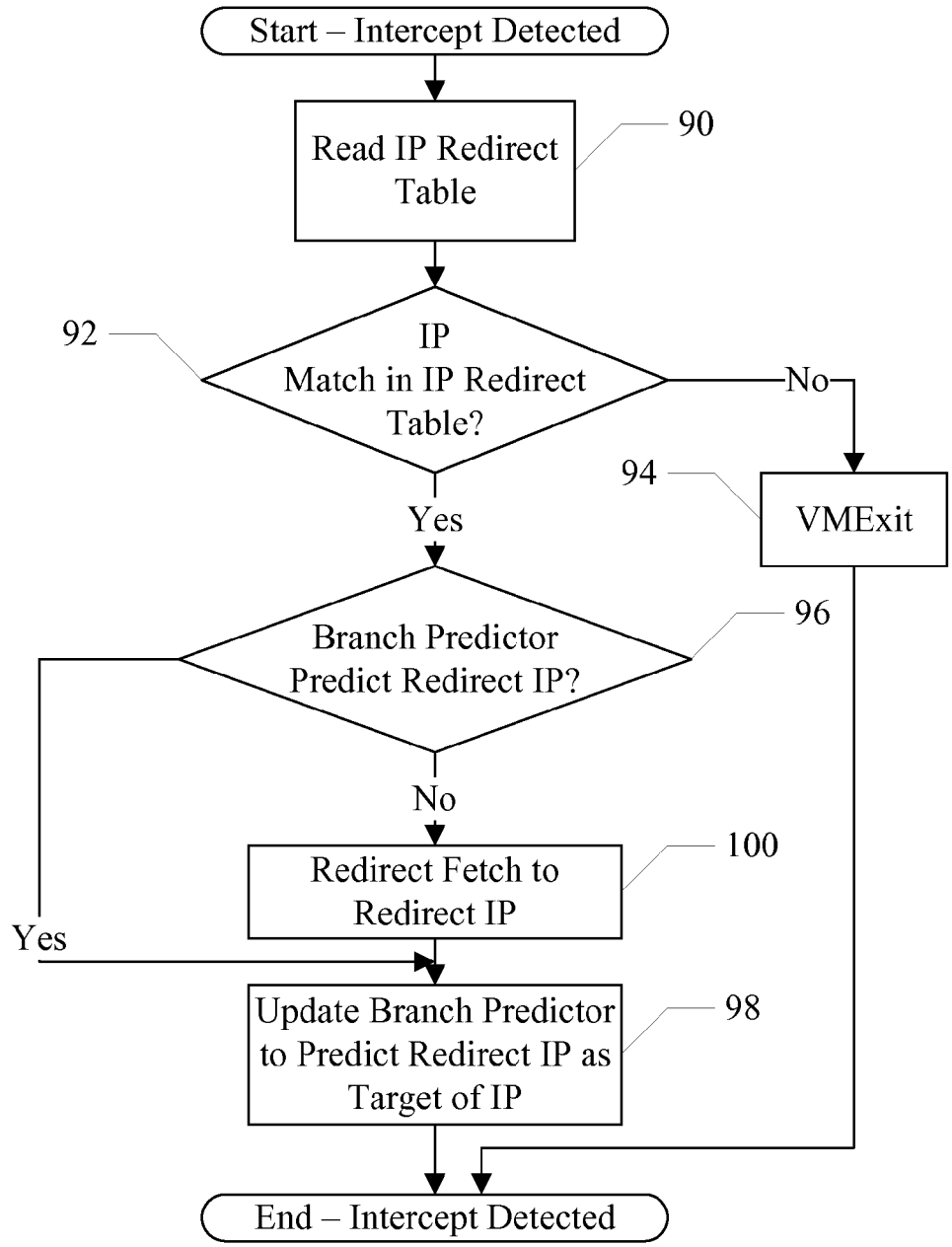
FIG. 3 is a flowchart illustrating operation of one embodiment of a processor in response to detecting an intercept.

Turning now to FIG. 3, a flowchart is shown illustrating operation of one embodiment of a processor, and more particularly a redirect unit in the processor in one embodiment, in response to detecting an intercept for an instruction. While the blocks are shown in a particular order for ease of understanding, other orders may be used. Blocks may be performed in parallel in combinatorial logic in the redirect unit. Blocks, combinations of blocks, and/or the flowchart as a whole may be pipelined over multiple clock cycles. In some embodiments, a portion or all of the redirect unit may be implemented in microcode in the processor.

The redirect unit may receive the IP of the instruction for which the intercept was detected, and may read the IP redirect table 70 responsive to the IP (block 90). If the redirect unit detects that there is no match in the IP redirect table 70 (decision block 92, "no" leg), the redirect unit may cause a VMExit from the guest to the VMM 18 for processing (block 94). On the other hand, if the redirect unit detects a match in the IP redirect table (decision block 92, "yes" leg), the redirect unit may detect whether or not a branch prediction unit in the processor predicted the redirect IP output from the IP redirect table 70 (decision block 96). For example, the processor may tag the instruction with the predicted target address as the instruction flows through the pipeline, and the redirect unit may compare the predicted target address to the redirect address. If the branch predictor did predict the redirect IP (decision block 96, "yes" leg), the redirect unit may transmit an update to the branch predictor indicating that the branch prediction is correct, and the branch predictor may update (block 98). For example, the branch predictor may include a saturating counter indicating whether a prediction is strong or weak. The branch predictor may update the counter to indicate more strongly taken in response to the indication that the branch prediction is correct. If the branch predictor did not predict the redirect IP (decision block 96, "no" leg), the redirect unit may redirect fetching of the processor to the redirect IP (block 100). Additionally, the redirect unit may transmit an update to the branch predictor to predict the redirect IP as the target address for the IP (block 98). In some embodiments, the redirect unit may also provide an indication that the routine stored at the redirect IP executes with elevated privilege and/or otherwise changed protection and memory access attributes.

It is noted that checking for a branch prediction and updating the branch predictor when a match is detected in the IP redirect table 70 are optional, and may not be implemented in some embodiments, if desired.

Figure 4:
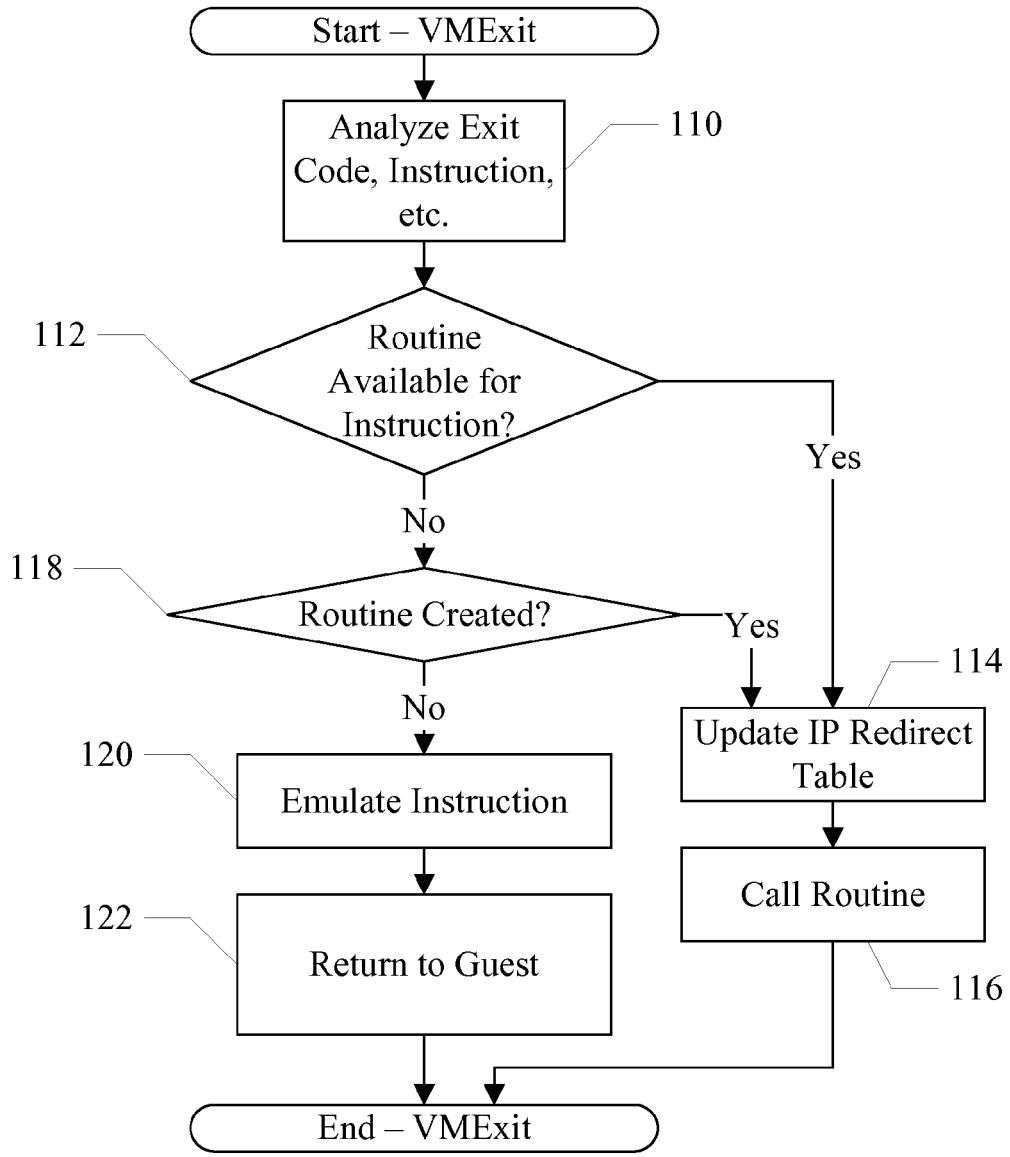
FIG. 4 is a flowchart illustrating operation of one embodiment of the VMM in response to a VMExit

Turning now to FIG. 4, a flowchart is shown illustrating operation of one embodiment of the VMM 18 in response to a VMExit (signalled due to an intercept in a guest 10A-10N). The VMM 18 (and/or the minivisor, in some embodiments) may comprise instructions which, when executed, implement the operation illustrated in FIG. 4. While the blocks are shown in a particular order for ease of understanding, other orders may be used.

The VMM 18 may analyze the exit code in the VMCB 22 for the guest, the instruction bytes of the instruction (read from the guest), and any other desired data to determine what processing is needed for the intercept (block 110). If a routine 72A-72C is available to perform the processing (decision block 112, "yes" leg), the VMM 18 may update the IP redirect table 70 to include the IP of the instruction and the redirect IP to the corresponding routine (block 114). The VMM 18 may also call the routine for processing (block 116). For example, the VMM 18 may update the VMCB 22 of the guest to point to the beginning of the routine, and may execute a VMRUN instruction. Alternatively, the VMM 18 may emulate the processing and execute the VMRUN, and subsequent intercepts of the instruction may be redirected via the IP redirect table 70.

If a routine is not currently available for the instruction, the VMM 18 may determine if a routine is to be dynamically created for the instruction (decision block 118). If so (decision block 118, "yes" leg), the VMM 18 may generate the routine and store the routine in memory. The VMM 18 may update the IP redirect table 70 with the IP of the instruction (block 114) and may call the routine (block 116) (or alternatively emulate the routine, as mentioned above).

If no routine is available and no routine is to be created (decision blocks 112 and 118, "no" legs), the VMM 18 may emulate the instruction (block 120) and may return to the guest using the VMRUN instruction (block 122).

Figure 5:
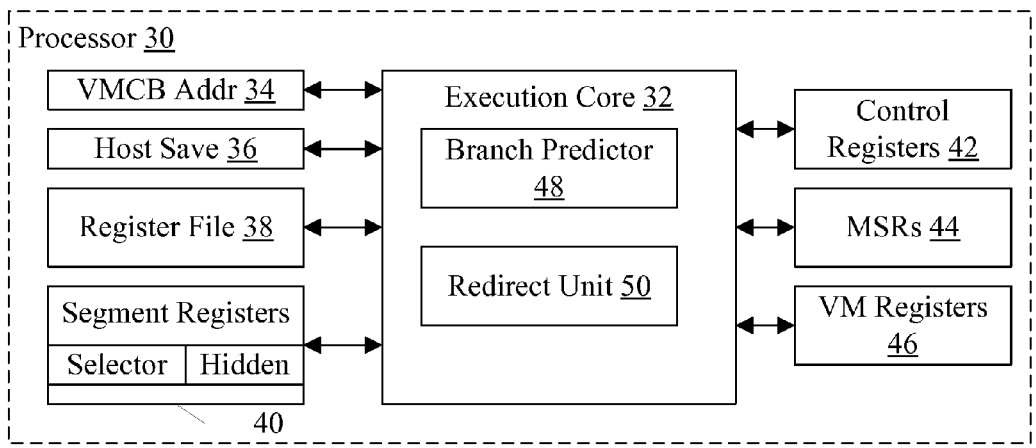
FIG. 5 is a block diagram of one embodiment of a processor.

FIG. 5 is a block diagram illustrating one embodiment of a processor 30 that may be included in the host hardware 20. In the illustrated embodiment, the processor 30 includes an execution core 32, a VMCB address register 34, a host save register 36, a register file 38, a set of segment registers 40, a set of control registers 42, a set of model specific registers (MSRs) 44, and a set of virtual machine (VM) registers 46. The execution core 32 is coupled to each of the registers 34, 36, 38, 40, 42, 44, and 46.

Generally, the execution core 32 is configured to execute the instructions defined in the instruction set architecture implemented by the processor 30 (e.g. the x86 instruction set architecture, including AMD64™ extensions, in some embodiments). The execution core 32 may employ any construction. For example, the execution core 32 may be a superpipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions. The execution core 32 may also include a branch predictor 48 and a redirect unit 50. The branch predictor 48 may implement any desired branch prediction mechanism. Additionally, the branch predictor 48 may be configured to receive an update from the redirect unit 50 to predict IP redirects indicated in the IP redirect table 70. The redirect unit 50 may implement the IP redirect functionality described above. In various embodiments, the redirect unit 50 may be implemented in hardware logic circuitry, microcode, and/or a combination thereof.

When executing a VMRUN instruction (described above and in more detail below), the execution core 32 may save the address of the VMCB identified by the VMRUN instruction in the VMCB address register 34. Subsequently, during a guest exit, the execution core 32 may save the partial processor state to the VMCB indicated by the VMCB address register 34. The amount of processor state saved depends on the exit mechanism being used for the detected intercept event. The host save register 36 may store an address of a host save area in which host processor state (e.g. corresponding to the VMM 18) may be saved. The execution core 32 may save VMExit partial processor state in the host save area during execution of the VMRUN instruction, and may load VMExit partial processor state from the host save area during a guest exit to the VMM 18.

In one embodiment, the minivisor partial processor state may be stored in the VMCB 22 of a given guest, in addition to the partial processor state corresponding to the guest itself. Accordingly, guest exit to the minivisor may include storing the partial processor state to the VMCB 22 and loading the minivisor state from the VMCB 22.

The register file 38 may comprise various registers defined for use with the instructions that the execution core 32 is configured to execute. For example, the register file 38 may comprise integer registers, floating point registers, multimedia registers, etc.

The segment registers 40 may be provided in accordance with the x86 instruction set architecture. More particularly, the segment registers 40 may be part of the privilege protection mechanism employed by the processor 30 when the processor is in protected mode. In protected mode, each segment register 40 may be loaded with a segment selector using a segment load instruction. The segment selector identifies a segment descriptor in a segment descriptor table in memory that sets the privilege level for the segment and also includes other protection control bits and other information. When a segment selector is loaded into a segment register 40, the execution core 32 loads the segment descriptor from the segment descriptor table and loads the descriptor information, or information derived from the segment descriptor, into a hidden portion of the segment register. An exemplary segment register is illustrated in the segment registers 40, with a selector field and a hidden field.

The control registers 42 may comprise a variety of control registers that describe the general operating mode of the processor 30. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 42 varies from instruction set architecture to instruction set architecture. In embodiments implementing the x86 instruction set architecture (including AMD64™ extensions, if desired), the control registers 42 may include CR0, CR3, CR4, the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, etc.), etc.

The MSRs 44 may comprise one or more registers that are implementation dependent. That is, the instruction set architecture may permit a given implementation to define any set of MSRs 44 that may be desirable for that implementation.

The VM registers 46 may comprise one or more registers that are included in the processor 30 to provide virtual machine support (that is, to support virtualization for the guests 10A-10N). The VMCB address register 34 and the host save register 36 may be considered to be VM registers 46, but have been shown separately in FIG. 3 to illustrate the world switch functionality of the processor 30. For example, the VM registers 46 may include registers that may be loaded with virtual interrupt state to permit an interrupt to be injected into a guest. The VM registers 46 may also include an intercepts register or registers. The intercept register or registers may store the intercept configuration. The execution core 32 may be configured to monitor for various intercepts indicated in the intercepts register, and to exit using the exit mechanism as indicated in the intercepts register. The intercepts register may be loaded from the VMCB 22 of a guest 10A-10N when execution of that guest 10A-10N is initiated (e.g. using the VMRUN instruction described above). Other VM registers 46 may be included to virtualize various other processor state, system resources, etc. In some embodiments, some or all of the VM registers 46 may be defined as MSRs. In one embodiment, the base address register for the IP redirect table 70 may be a VM register 46.

As used herein, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 38 may be implemented in such a fashion, in some embodiments. Any combination of implementations may be used in various embodiments of the processor 30.

The various registers 34, 36, 38, 40, 42, 44, and 46 may comprise processor state in one embodiment. Any other registers may be implemented in other embodiments that may be part of the processor state, as desired.

Figure 6:
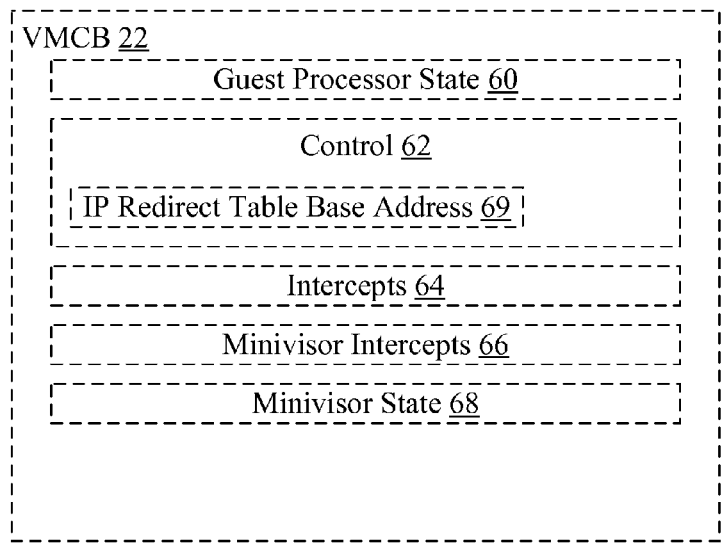
FIG. 6 is a block diagram illustrating one embodiment of a virtual machine control block.

FIG. 6 is a block diagram of one embodiment of a VMCB 22. In the embodiment of FIG. 6, the VMCB 22 may include a guest processor state 60, control data 62, intercepts 64, minivisor intercepts 66, and minivisor state 68. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state and/or architected state that is considered part of the processor's context. The guest processor state 60 may correspond to an initial state of the processor if the guest has not yet executed. The processor 30 may load processor state of the processor 30 from the guest processor state 60 during execution of the VMRUN instruction. The processor 30 may save processor state from the processor 30 to the guest processor state 60 during the guest exit. The guest processor state 60 may be defined to store all the processor state, even though the processor 30 only saves/loads partial state as described above. Other state may be saved/loaded by the VMM 18 and/or the minivisor as needed. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60.

The control data 62 may include any desired control information to be used when execution of the corresponding guest is initiated or exited. As mentioned previously, the control data 62 may include a guest exit code written by the processor 30 upon guest exit to indicate the reason for guest exit. Additionally, as illustrated in FIG. 6, the control data 62 may include the IP redirect table base address 69, which may be loaded into a register used by the redirect unit 50 to locate the IP redirect table 70 in memory. The intercepts 64 may specify which events are enabled for intercept (causing an exit from the guest). The intercepts 64 may define exits to the VMM 18, using the VMExit mechanism. Similarly, the minivisor intercepts 66 may specify which events are enabled for intercept, causing a guest exit to the minivisor. In other embodiments, the intercepts 64 may specify which intercept events are enabled for intercept, and the intercepts 66 may indicate which exit mechanism to use (VMExit or minivisor exit). Various intercepts may be defined in various embodiments. In one embodiment, at least some of the intercepts are defined as intercept indications in the intercepts 64. Each intercept indication may, e.g., be a bit which may enable the intercept when set or disable the intercept when clear. Other embodiments may assign the opposite meanings to the states of the bit or may use other indications. There may be one intercept indication in the intercepts 64 and one intercept indication in the intercepts 66 for each intercept event. Thus, the intercepts 64 and 66 may comprise one embodiment of an intercept configuration.

The minivisor state 68 may comprise the processor state corresponding to the minivisor. The minivisor state 68 may be smaller than the guest processor state 60, in general. A more specific example of the minivisor state 68 is discussed below. In other embodiments, the minivisor state 68 may be stored in a separate data structure than the VMCB 22. In embodiments implementing the minivisor page table base address register, the minivisor page table base address register may be considered part of the minivisor state 68.

Figure 7:
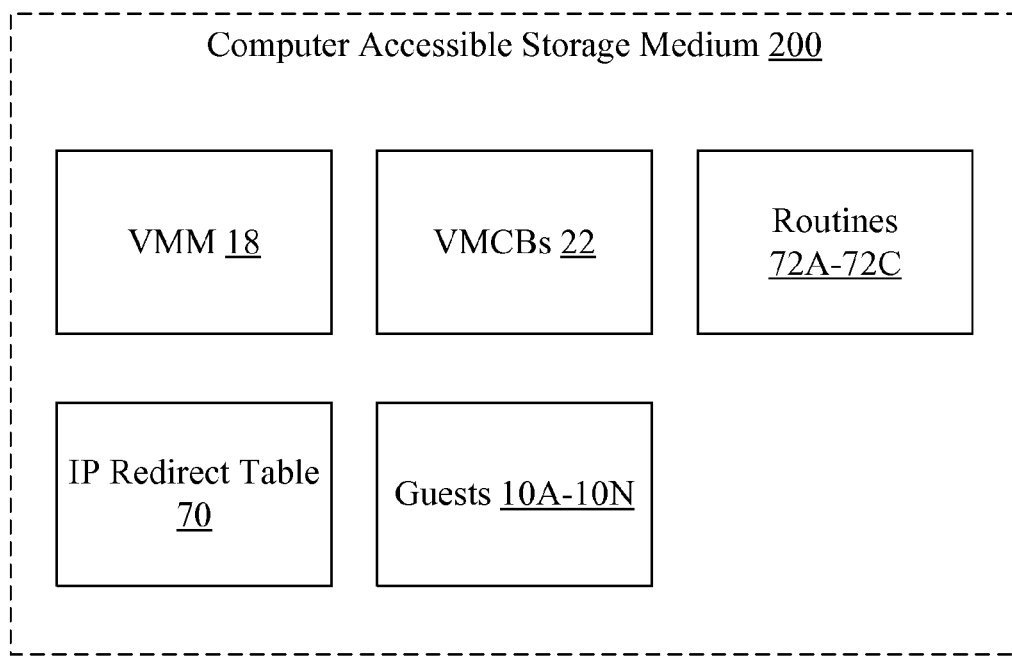
FIG. 7 is a block diagram of one embodiment of a computer accessible storage medium.

Turning now to FIG. 7, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. The computer accessible storage medium 200 in FIG. 7 may store one or more of the VMM 18, one or more VMCBs 22, one or more routines 72A-72C, the IP redirect table 70, and/or guests 10A-10N. The VMM 18 may comprise instructions which implement the operations described for the VMM 18 herein. Generally, the computer accessible medium 200 may store any set of instructions which, when executed, implement a portion or all of the operations shown in FIG. 4. The computer accessible storage medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A method comprising:
   in a processor, detecting an intercept of an instruction that is in a guest that is controlled by a virtual machine monitor (VMM), wherein the instruction has an associated instruction pointer (IP) used to locate the instruction in memory;
   detecting a match by the associated IP in an IP redirect table responsive to detecting the intercept;

redirecting instruction fetch in the processor to a routine identified in the IP redirect table responsive to the match instead of exiting the guest to the VMM;

fetching a second instruction in the guest, wherein the second instruction is represented in the IP redirect table with a first IP of the second instruction and a corresponding second IP of a corresponding routine to be executed instead of exiting the guest in response to intercepting the second instruction in the guest;

a branch predictor predicting the second IP as a target address for the second instruction responsive to the first IP;

responsive to the predicting, fetching from the second IP; and inhibiting the IP redirect table from redirecting fetching to the second IP in response to an intercept of the second instruction, responsive to detecting that the branch predictor predicted the second IP as the target address.

2. The method as recited in claim 1 wherein detecting the match comprises reading at least one entry in the IP redirect table responsive to the associated IP.

3. The method as recited in claim 2 wherein detecting the match further comprises comparing at least a portion of the associated IP to an IP in the at least one entry and detecting a match in the comparing.

4. The method as recited in claim 1 wherein the associated IP is a guest virtual address.

5. The method as recited in claim 1 wherein the associated IP is a guest physical address.

6. The method as recited in claim 1 wherein the associated IP is a host virtual address.

7. The method as recited in claim 1 wherein the associated IP is a host physical address.

8. The method as recited in claim 1 further comprising:

detecting an intercept of a third instruction that is in the guest, wherein the third instruction has a third associated IP;

detecting a lack of match for the third associated IP in the IP redirect table; and exiting the guest to the VMM in response to detecting the lack of match.

9. The method as recited in claim 8 further comprising:

determining in the VMM, that a corresponding third routine is available to handle the intercept of the third instruction; and updating the IP redirect table to redirect the third associated IP to an address of the corresponding third routine.

10. A processor comprising:

a redirect unit configured to detect a match of a first instruction pointer (IP) in an IP redirect table, the first IP corresponding to a guest instruction that the processor has intercepted, wherein a guest that includes the guest instruction is executed under control of a virtual machine monitor (VMM), and wherein the redirect unit is configured to redirect instruction fetching by the processor to a routine identified in the IP redirect table instead of exiting to the VMM in response to the intercept of the guest instruction; and a branch prediction unit, wherein the branch prediction unit is updated to predict a second IP of the routine responsive to the first IP of the guest instruction during use, wherein the branch prediction unit is updated responsive to intercepting the guest instruction during use, and wherein the branch prediction unit is configured to predict the second IP responsive to the first IP during fetch of the guest instruction, and wherein the processor is configured to fetch instructions from the routine responsive to the second IP predicted by the branch prediction unit, and wherein the redirect unit is configured to detect the intercept of the guest instruction and to detect that the second IP of the routine was predicted by the branch prediction unit, and wherein the redirect unit is configured to inhibit the IP redirect table from redirecting the processor to the second IP responsive to the branch prediction unit predicting the second IP of the routine.

11. The processor as recited in claim 10 further comprising a register coupled to the redirect unit, the register storing a base address of the IP redirect table, and wherein the redirect unit is configured to read at least one entry of the IP redirect table responsive to the first IP and the base address to detect the match.

12. The processor as recited in claim 10 wherein the redirect unit is configured to detect a lack of match of the first IP in the IP redirect table, and to exit the guest to the VMM in response to the lack of match.

* * * * *